(12) United States Patent
Oh et al.

(10) Patent No.: US 6,519,974 B1
(45) Date of Patent: Feb. 18, 2003

(54) METHOD FOR FABRICATING AN OPTICAL FIBER BY SIMULTANEOUS PREFORM FUSING AND FIBER DRAWING

(75) Inventors: Seung-Hun Oh, Gumi (KR); Ki-Un Namkoong, Deagukwangyeok (KR); Jin-Han Kim, Gumi (KR)

(73) Assignee: Samsung Electronics Co., Ltd., Suwon (KR)

( * ) Notice: Subject to any disclaimer, the term of this patent is extended or adjusted under 35 U.S.C. 154(b) by 777 days.

(21) Appl. No.: 08/872,876

(22) Filed: Jun. 10, 1997

(30) Foreign Application Priority Data

Jun. 10, 1996 (KR) .............................. 96-20635

(51) Int. Cl.$^7$ ............................................ C03B 37/027
(52) U.S. Cl. ............................. 65/379; 65/412; 65/428; 65/489
(58) Field of Search ..................... 65/379, 412, 428, 65/489

(56) References Cited

U.S. PATENT DOCUMENTS

| | | | |
|---|---|---|---|
| 2,980,957 A | 4/1961 | Hicks, Jr. | |
| 3,037,241 A | 6/1962 | Bazinet, Jr. et al. | |
| 3,236,710 A | 2/1966 | Curtiss | |
| 3,933,454 A | 1/1976 | DeLuca | |
| 4,198,223 A | 4/1980 | Goell et al. | |
| 4,264,347 A | 4/1981 | Shintani et al. | |
| 4,602,926 A | 7/1986 | Harrison et al. | |
| 4,772,303 A | 9/1988 | Kamiya et al. | |
| 4,793,842 A | * 12/1988 | Yokota ........................ 65/412 |
| 4,820,322 A | 4/1989 | Baumgart et al. | |
| 5,073,179 A | 12/1991 | Yoshimura et al. | |
| 5,152,818 A | * 10/1992 | Berkey ......................... 65/412 |
| 5,314,518 A | 5/1994 | Ito et al. | |
| 5,560,759 A | 10/1996 | Koran et al. ................... 65/388 |
| 5,578,106 A | 11/1996 | Fleming, Jr. et al. .......... 65/391 |
| 5,658,363 A | * 8/1997 | Ince ............................. 65/412 |

FOREIGN PATENT DOCUMENTS

| | | | | |
|---|---|---|---|---|
| DE | 37 31 806 | 6/1989 | | |
| DE | 40 05 729 | 8/1991 | | |
| DE | 42 26 343 | 2/1994 | | |
| EP | 501429 | * 9/1992 | ................... 65/412 |
| JP | 52-48329 | * 4/1977 | ................... 65/428 |
| JP | 54-131043 | * 10/1979 | ................... 65/428 |
| JP | 3-200124 | * 9/1991 | ................... 65/412 |

* cited by examiner

Primary Examiner—John Hoffmann
(74) Attorney, Agent, or Firm—Robert E. Bushnell, Esq.

(57) ABSTRACT

Disclosed is an apparatus for fabricating an optical fiber, which comprises a furnace for melting a sealed preform assembly to draw an uncoated optical fiber, a coater for coating the uncoated optical fiber, a capstan for drawing the optical fiber from the optical fiber preform by applying a drawing force, an adjoiner for holding a primary optical fiber preform inserted centrally into an overcladding tube with an equidistant space between the outer surface of the primary optical fiber preform and the inner surface of the overcladding tube, and a preform positioner for supporting the sealed preform assembly in a specified position with respect to the furnace. The adjoiner has passages that provide an inlet for receiving a flow of gas, a channel in which the flow of gas generates a reduced pressure region, and a suction tube for extending the reduced pressure region to the interior space of the overcladding tube, whereby fusing of the overcladding tube to the primary optical fiber preform is achieved during the drawing operation.

24 Claims, 6 Drawing Sheets

METHOD FOR FABRICATING AN OPTICAL FIBER BY SIMULTANEOUS PREFORM FUSING AND FIBER DRAWING

CLAIM OF PRIORITY

This application makes reference to, incorporates the same herein, and claims all benefits accruing under 35 U.S.C. §119 from an application for APPARATUS FOR FABRICATING AN OPTICAL FIBER AND METHOD THEREFOR earlier filed in the Korean Industrial Property Office on the 10$^{th}$ day of June 1996 and there duly assigned Ser. No. 20635/1996, a copy of which application is annexed hereto.

BACKGROUND OF THE INVENTION

1. Field of the Invention

The present invention concerns an apparatus for drawing an optical fiber from an optical fiber preform. In particular, this invention concerns an apparatus for simultaneously fusing a core preform and a cladding tube and drawing a clad optical fiber from the fused combination.

2. Description of the Related Art

Quartz optical fibers, such the fibers currently used in ultra high speed data communication networks, typically are fabricated by one of two methods: the outside vapor deposition (OVD) method or the modified chemical vapor deposition (MCVD) method. The OVD method comprises the steps of hydrolyzing a chemical gas consisting of gaseous $SiCl_4$ and a dopant by firing with a simultaneously supplied oxygen to deposit $SiO_2$ soot on the outside of a suitable starter rod: and dehydrating the deposited soot in a high temperature furnace by using $Cl_2$ and He, which also sinters the soot so as to form an optical fiber preform.

The MCVD method requires more complicated processing but has certain advantages over OVD. MCVD involves deposition of several layers on the inside of a quartz tube by simultaneously supplying oxygen and a chemical gas consisting of $SiCl_4$ and a dopant. In the layer deposition process the cladding layers are laid down first, and then the layers that will form the core are deposited. After deposition of the layers, the internally-layered quartz tube is heated in the presence of $Cl_2$ and He so as to form a compact quartz rod.

The MCVD method, used by itself, has the inherent limitation that it is not suitable to make preforms of more than 25 mm in diameter. In order to overcome this limitation, MCVD is often practiced with a so-called overcladding method, which allows fabrication of relatively large preforms and thus improves productivity for the fiber fabrication process. Overcladding involves, in general terms, placing a rod preform inside a tube made of a suitable overcladding material, fusing the rod and tube together to form a secondary preform, and drawing from the secondary preform an optical fiber comprising a core enclosed within a cladding layer. In this form of MCVD, obviously, the layers generated in the internal deposition process need not include both core layers and cladding layers.

Thus, a high-productivity implementation of the MCVD method requires three essential steps: preparing a primary optical fiber preform by internal deposition, overcladding the primary optical fiber preform to obtain a secondary optical fiber preform, and finally drawing an optical fiber from the secondary optical fiber preform. Carrying out these three steps separately requires substantial amounts of time and consequently has a negative effect on productivity.

Another disadvantage of this approach is that the step of overcladding the primary optical fiber preform typically requires a large amount of oxygen or hydrogen. Furthermore, for the case where the primary optical fiber preform is relatively large, the overcladding step in itself requires application of a relatively large amount of heat. This application of heat, in combination with the effects of the heat necessary for the drawing step, has the effect of degrading the transmission characteristics, such as attenuation characteristics, of the finished optical fiber.

Combination of the overcladding and drawing steps has long been a goal in the glass fiber industry. See, for example, U.S. Pat. No. 2,980,957, issued in 1961 to Hicks, Jr., and U.S. Pat. No. 3,037,241, issued in 1962 to Bazinet, Jr. et al. These early attempts recognized the advantage of using a partial vacuum, or pressure differential between the outside and the inside of the tube, to promote collapse of the overcladding tube about the core rod prior to a drawing stage. They could not succeed, though, in consistently producing optical fibers with the long lengths and low loss characteristics necessary for modern fiberoptic communications applications. As a result, the industry has substantially relied upon deposition methods and rod-and-tube methods including a separate preform fabrication stage.

One problem inherent in combining the fusing and drawing stages has been to control the application of vacuum with sufficient precision that the finished optical fiber has sufficient strength and optical quality for modern communications applications. U.S. Pat. No. 4,772,303, issued to Kamiya et al., for example, proposed an MCVD technique combining drawing and tube collapsing in a continuous process. This process comprises application of a partial vacuum, but it requires a sophisticated suction system including a vacuum pump, a differential pressure gauge, an inert gas supply, a gas flow rate regulator, a flow rate setter, and preferably an automatic switching valve. Such a system provides for a small pressure differential and allows fine adjustment if it, but it is expensive and complicated to implement. Also, because it does not include overcladding, this approach does not address the issue of proper alignment between rod and tube.

Proper alignment goes to another intrinsic problem in overcladding methods: controlling the thickness of the cladding layer on the optical fiber produced to ensure uniformity. For example, U.S. Pat. No. 4,820,322, issued to Baumgart et al., presented a rod-and-tube approach that yields a strong fiber with concentric core and cladding. This method uses vacuum to promote collapse of the overcladding tube, and it can be practiced either in a separate manufacturing phase or in a continuous process combined with drawing of the fiber. However, it lacks any particular means to control the vacuum applied and thus may require complicated vacuum equipment to achieve optimal results. The Baumgart approach also has a limit on the gap between the rod and the overcladding tube: the tube inside diameter cannot exceed the rod diameter by more than a certain amount. Furthermore, the embodiment combining collapsing the tube and drawing the fiber does not use an affirmative means to center the rod in the tube, relying instead for concentricity on inherent self-centering forces thought to be present as the clad fiber is drawn from the tip of the rod-and-tube preform.

We have therefore noticed that a need exists for a simple apparatus and method of drawing a high quality optical fiber from a rod-and-tube preform while simultaneously fusing the rod and the overcladding tube. This approach should employ a low-intensity vacuum source that permits fine adjustment of the differential pressure. It should also provide for controlled alignment of the core rod and the overcladding tube to ensure that the desired circumferential uniformity of the cladding layer in the drawn fiber is achieved. To maximize productivity, though, the process should not require an intricate alignment procedure as the rod and tube are mounted in the drawing plant. Preferably, these objectives would be achieved through an inexpensive apparatus that requires little hardware in addition to the equipment already present in the drawing plant.

SUMMARY OF THE INVENTION

It is therefore an object of the present invention to provide an apparatus and a method for overcladding a primary optical fiber preform while simultaneously drawing a finished optical fiber from the overclad preform.

It is also an object of this invention to include in such an apparatus and method a means to apply a finely-controlled pressure differential to the operation of collapsing the overcladding tube onto the core preform.

It is another object of this invention to provide such an apparatus and method that will reduce the production costs for fabricating optical fibers while maintaining or improving the quality of the finished fibers, such as their low attenuation characteristics.

It is a further object of the present invention to provide such an apparatus and method capable of being implemented with inexpensive additional hardware.

To achieve these and other objects, the present invention provides in one aspect an apparatus for fabricating an optical fiber from a primary optical fiber preform and an overcladding tube, the apparatus comprising an adjoiner, a furnace, and a preform positioner. The primary optical fiber preform has a first primary axis and an outer surface, and the overcladding tube has a second primary axis and an inner surface and defines within it an interior space. The adjoiner is adapted to be assembled with the primary optical fiber preform and the overcladding tube into a secondary preform assembly. The adjoiner is further adapted to hold, in the secondary preform assembly, the primary optical fiber preform in a centrally inserted position within the interior space defined by the overcladding tube and with the first and second primary axes in substantial alignment. The adjoiner has defined within it a plurality of passages that provide an inlet for receiving a flow of gas, a region in which the flow of gas generates a condition of reduced pressure, and an extension of the region of reduced pressure to the interior space. The furnace heats a portion of the primary optical fiber preform and a portion of the overcladding tube to a softened state from which an optical fiber can be drawn. The preform positioner positions the secondary preform assembly in a specified position with respect to the furnace.

A second aspect of the present invention provides a method for fabricating an optical fiber from a primary optical fiber preform and an overcladding tube. The primary optical fiber preform and the overcladding tube are similar to those associated with the first aspect of the invention. The method includes the steps of assembling a secondary preform assembly having an upper end and a lower end and including the primary optical fiber preform, the overcladding tube, and an adjoiner. The adjoiner holds the primary optical fiber preform in a centrally inserted position within the interior space of the overcladding tube and with the first and second primary axes in substantial alignment. The adjoiner also has defined within it a plurality of passages to provide an inlet for a flow of gas, a region in which the flow of gas generates a condition of reduced pressure, and an extension of the region of reduced pressure to the interior space. The method further includes the step of sealing the lower end by heating to form a sealed preform assembly and applying a lower portion of the sealed preform assembly to a furnace and applying a flow of gas to the inlet of the adjoiner, thereby fusing a part of the overcladding tube adjacent to the lower end of the sealed preform assembly to the primary optical fiber preform. The method also includes the step, simultaneous with the applying step, of drawing from the lower end of the sealed preform assembly an optical fiber.

BRIEF DESCRIPTION OF THE DRAWINGS

A more complete appreciation of the present invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

Figure 1:
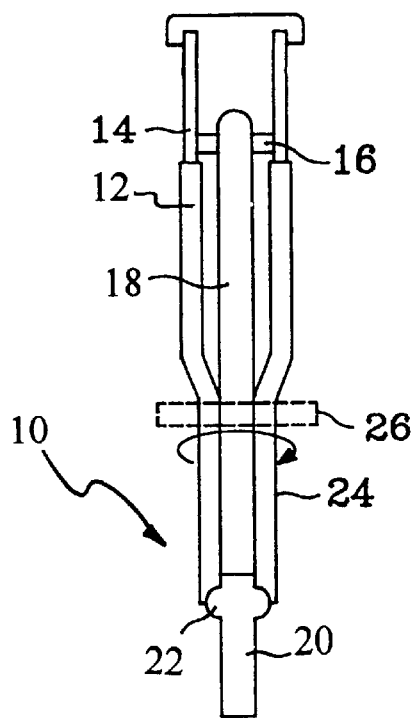
FIG. 1 is a longitudinal cross-section view illustrating a primary optical fiber preform concentrically arranged in an overcladding tube.
Figure 2:
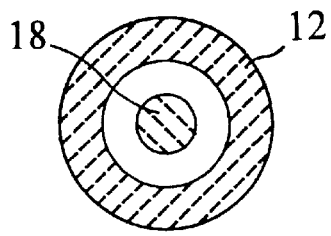
FIG. 2 is a transversal cross-section view of the arrangement shown in FIG. 1.
Figure 3:
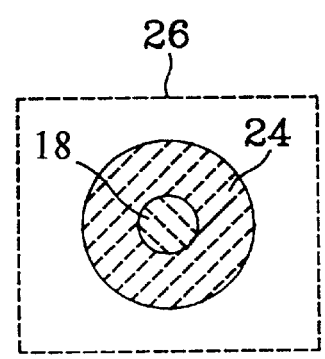
FIG. 3 shows a cross-section of the arrangement of FIGS. 1 and 2, but after the overcladding tube is fused with the primary optical fiber preform.

The generic overcladding method will first be described with reference to FIGS. 1, 2 and 3. FIG. 1 shows an arrangement in which a secondary optical fiber preform 10 is fabricated. An overcladding tube 12 has attached, concentrically at one end, a lower-purity tube 14 that provides support for overcladding tube 12. A support ring 16 is inserted into the supporting tube 14 to center a primary optical fiber preform 18 within overcladding tube 12. To this end, it is desirable to make support ring 16 have a thickness of at least 10 mm. FIG. 2 shows a cross section of primary optical fiber preform 18 mounted inside overcladding tube 12.

Attached to the lower end of primary optical fiber preform 18 is a support rod 20, whose upper end, positioned at the lower end of the overcladding tube 12, is heated to form a swollen globe 22. When heated to an appropriate temperature, globe 22 and the lower end of overcladding tube 12 fuse and thereby hermetically seal the lower end of overcladding tube 12, as shown in FIG. 1. The external surface of overcladding tube 12 is then heated in successive lengths, while being rotated, to collapse overcladding tube 12 into a preform cladding 24 fused to primary optical fiber preform 18. Heat may be applied by a device such as a circumferential torch 26. Secondary optical fiber preform 10 results from this heating and fusion process. FIG. 3 illustrates a cross section of primary optical fiber preform and preform cladding 24 after being fused together by circumferential torch 26.

Figure 4:
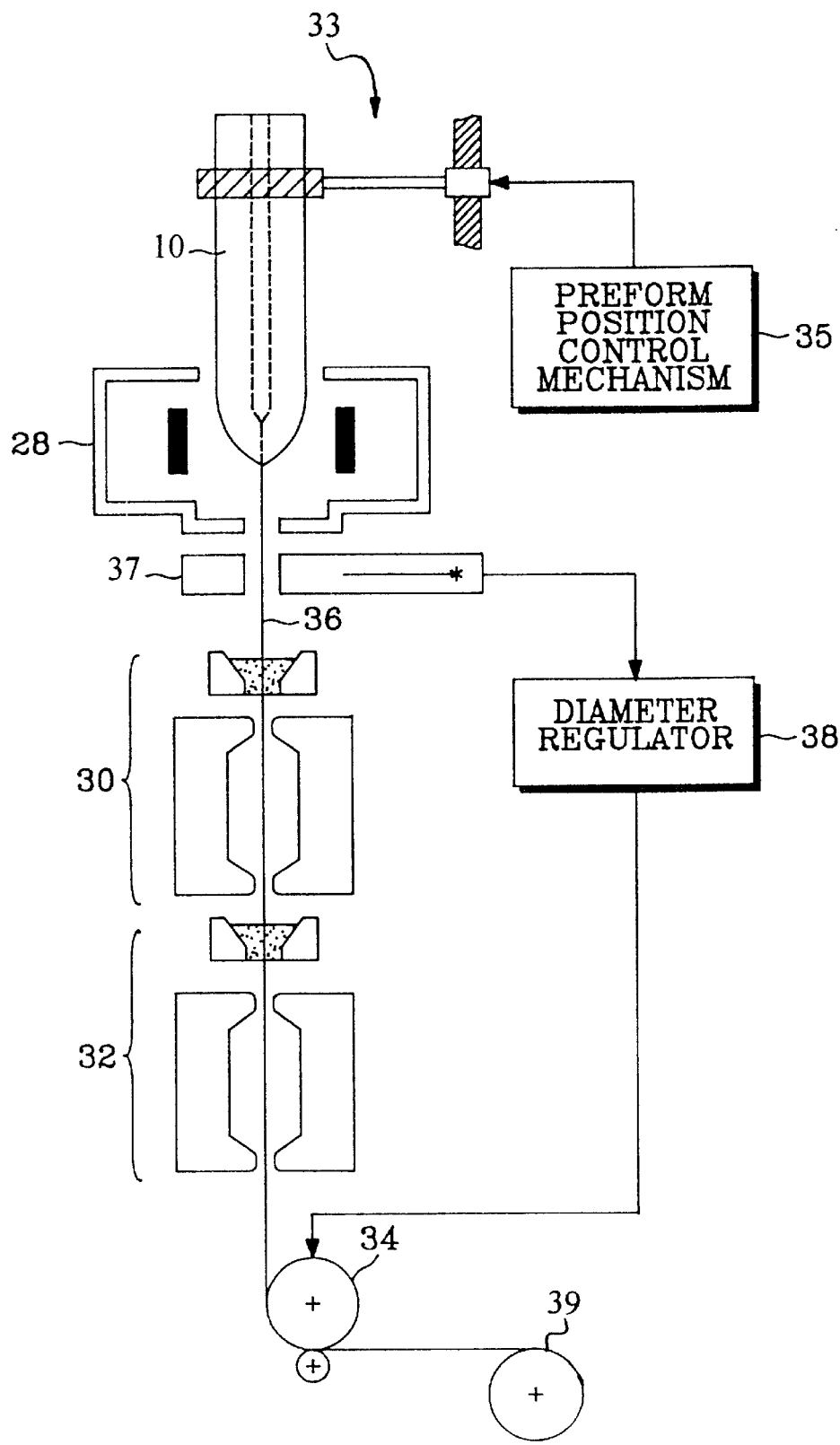
FIG. 4 is a block diagram illustrating a general apparatus for fabricating an optical fiber from a rod-and-tube preform.

FIG. 4 illustrates a plant for and the process of drawing an optical fiber from secondary optical fiber preform 10. With reference to FIG. 4, a preform positioner 33 positions optical fiber preform 10 and slowly supplies it to a furnace 28 under the control of a preform position control mechanism 35. Furnace 28 operates at several thousand degrees Celsius, typically 2100–2200° C. Heat from furnace 28 causes the lower end of secondary optical fiber preform 10 to become tapered. A drawing force is applied to the terminal part of this tapered end, and thereby an uncoated optical fiber 36 is drawn from secondary optical fiber preform 10. The drawing force to continuously draw optical fiber 36 is generated by rotation of a capstan 34.

A diameter measuring device 37 measures of the diameter of the uncoated optical fiber 36 and generates a measuring signal, which is transferred to a diameter regulator 38 to maintain the diameter of optical fiber 36 at a specified value, e.g., 125 µm. More specifically, diameter regulator 38 responds to the measuring signal by controlling the drawing force applied by capstan 34 in a predetermined manner to maintain the diameter of the uncoated optical fiber 36 at 125 µm. The cooled, uncoated optical fiber 36 is coated by first coater 30 and second coater 32 with a resin, such as acrylic or silicon, which provides a protective coating. Finally, the coated optical fiber 36 is wound around a spool 39.

Figure 5:
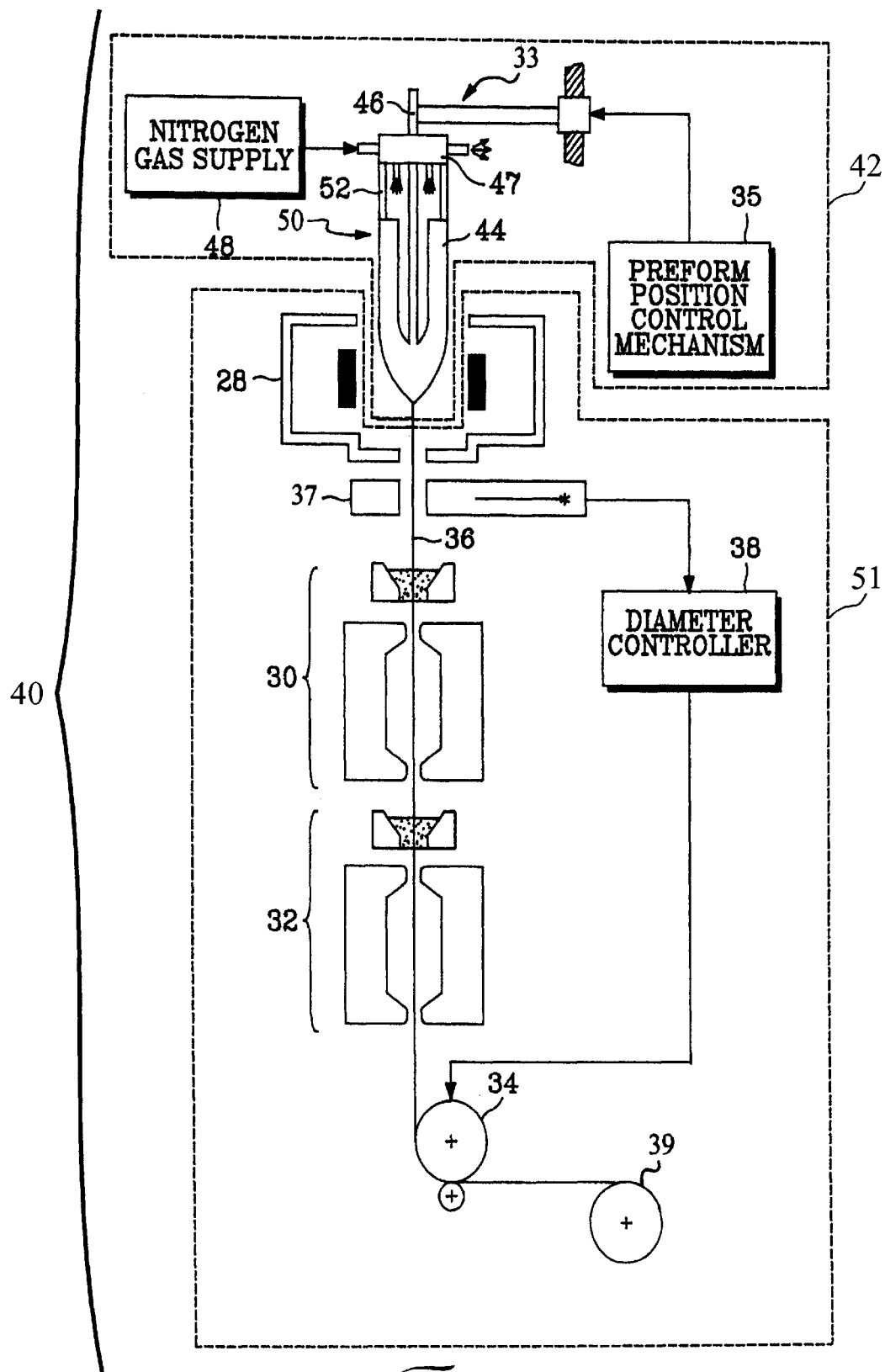
FIG. 5 is a block diagram showing an apparatus for fabricating the optical fiber according the present invention.

FIG. 5 illustrates an apparatus 40 and method for drawing an optical fiber according to the present invention. A preform supply unit 42 includes an adjoiner 47, a preform position control mechanism 35, and a nitrogen gas supply 48 and operates on materials including an overcladding tube 44 and a primary optical fiber preform 46. Primary optical fiber preform 46 may be prepared by internal deposition or another suitable process. Overcladding tube 44 eventually becomes the cladding layer of optical fiber 36, and its characteristics therefore determine the refractive index of the finally formed cladding. Preferably, when primary optical fiber preform 46 becomes fused with overcladding tube 44 in a sealed manner, the ratio of the core cross section to the cladding cross section is 45:125.

The method of the present invention includes a preliminary step of assembling a secondary preform assembly 50. One advantage of the apparatus of FIG. 5 consists in the ability to carry out this assembly step without shutting down the drawing plant and thereby suffering productivity losses. Primary optical fiber preform 46 is inserted into overcladding tube 44 and positioned with their primary (longitudinal) axes substantially coincident. Adjoiner 47 holds primary optical fiber preform 46 in this centrally inserted position within overcladding tube 44 to maintain the condition of axial coincidence. Secondary preform assembly 50 includes overcladding tube 44, primary optical fiber preform 46, adjoiner 47, and a junction piece 52. In the preferred embodiment, junction piece 52 is a quartz tube of suitable dimensions and low purity. Alternatively, junction piece 52 be any suitable coupling means to couple adjoiner 47 to the upper end of primary optical fiber preform 46 in a sealed manner, or it may constitute an integral part of adjoiner 47.

In the case where both members are nominally round in cross section, this axially coincident orientation provides an equidistant space between the outer surface of primary optical fiber preform 46 and the inner surface of overcladding tube 44. In other words, the (perpendicular) radial distance between the inner surface of overcladding tube 44 and any point on the outer surface of primary optical fiber preform 46 substantially equals the corresponding radial distance at any other point at the same longitudinal position on the outer surface. An equidistant space ensures circumferentially uniform collapse of overcladding tube 44 as it shrinks around and becomes fused to the outer surface of primary optical fiber preform 46. Uniform collapse, in turn, ensures that the thickness of the cladding layer in an optical fiber drawn from secondary preform assembly 50 will have substantial uniformity about the circumference of the fiber.

Where either overcladding tube 44 or primary optical fiber preform 46 is out of round, of course, axial coincidence may not provide an equidistant space between the two surfaces. The space may nevertheless be a uniform space in that axial coincidence combined with an appropriate angular orientation between the tube and preform cross sections may coincide a thicker tube wall in a particular direction with a narrower space, thereby allowing the fiber cladding layer to be substantially circumferentially uniform despite the out of round condition of the starting member or members. Alternatively, adjoiner 47 may be configured to provide axial alignment between primary optical fiber preform 46 and overcladding tube, but not axial coincidence. Such axial alignment might, for example, induce a predetermined eccentricity in the finished fiber fabricated from nonround (e.g., with elliptical cross section) or nominally round starting members.

Preform positioner 33 may be attached to an upper end of primary optical fiber preform 46 that protrudes from adjoiner 47, or it may be attached to a suitably placed handle on secondary preform assembly 50. Preform position control mechanism 35 controls the position of secondary preform assembly 50 in a predetermined manner to maintain the tapered lower end thereof at a position within furnace 28 suitable for fusing overcladding tube 44 to primary optical fiber preform 46 and for drawing an optical fiber therefrom. Nitrogen gas supply 48 forces a nitrogen gas through a channel, similar to a pipe, formed in the adjoiner 47. This feature serves to evacuate partially the space between the primary preform 46 and the overcladding tube 44, as described in more detail below.

A drawing unit 51 for drawing the optical fiber may include furnace 28, diameter regulator 38, first and a second coaters 30 and 32, respectively, and capstan 34, as described with reference to FIG. 4. Diameter measuring device 37, diameter controller 38, and spool 39, as well as other components equivalent, alternative, or in addition to those indicated in FIG. 5, may also be included in drawing unit 51.

Figure 6A:
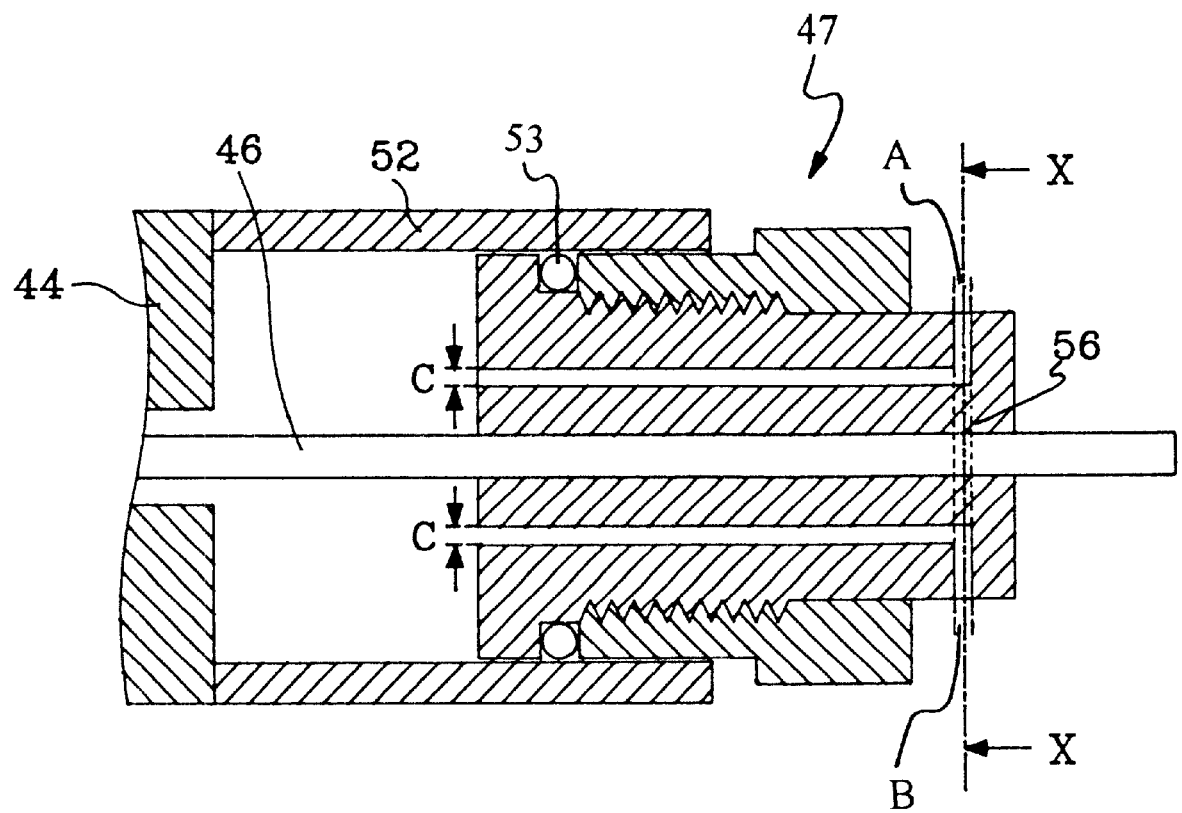
FIG. 6A shows a longitudinal cross-section detail of element 47 of FIG. 5.
Figure 6B:
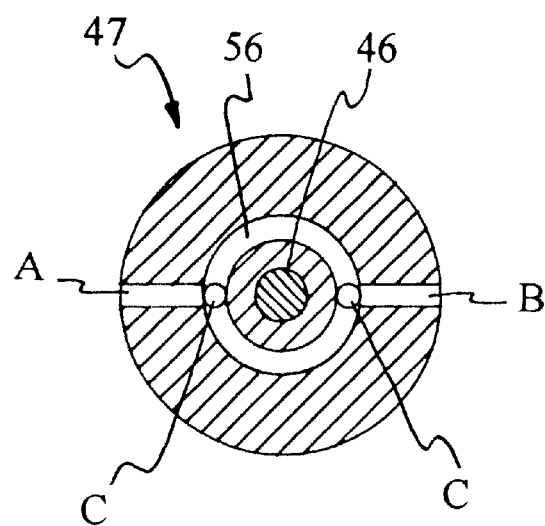
FIG. 6B shows a transversal cross-section detail of the same element 47 of FIG. 5.
Figure 6C:
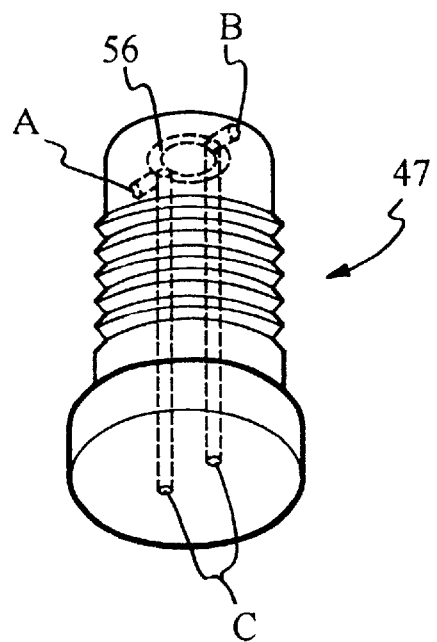
FIG. 6C shows a perspective view of the same element 47 of FIG. 5.

FIG. 6A illustrates a longitudinal cross section of adjoiner 47, and FIG. 6B shows a transverse cross section taken at the line X—X in FIG. 6A. FIG. 6C provides a perspective view of adjoiner 47. First, junction piece 52, such as a quartz tube of low purity, is provided to connect overcladding tube 44 with adjoiner 47 lengthwise (i.e., end to end). A sealer 53, such as an annular gasket, may be provided to ensure a sealed joint between the adjoiner and the junction piece. The upper end of 14 primary optical fiber preform 46 is fixedly attached to adjoiner 47 with their longitudinal axes substantially aligned. In the preferred embodiment, adjoiner 47 has an axial hole centered on its longitudinal axis and into which the upper end of primary optical fiber preform 46 is inserted. Alternatively, to produce an optical fiber with an eccentric cladding or to compensate for out-of-roundness in overcladding tube 44 or primary optical fiber preform 46, the attachment between adjoiner 47 and primary optical fiber preform 46 may provide alignment of their longitudinal axes but not coincidence.

In the preferred embodiment, adjoiner 47 has an annular channel 56 connected with an inlet tube A and an outlet tube B, which are defined within an upper end of adjoiner 47 and perpendicular to its longitudinal axis. One or more suction tubes C extend from the lower end of adjoiner 47 to its interior at the upper end, and generally parallel to its longitudinal axis, and communicate with channel 56. Suction tubes C provide a gas flow pathway from the space defined between primary optical fiber preform 46 and overcladding tube 44 to channel 56. Nitrogen gas is forced to flow into inlet tube A, through channel 56, and out of outlet tube B.

The flow of gas through channel 56 generates a condition of reduced pressure at the upper ends of suction tubes C, in accordance with Bernoulli's theorem, and therefore partially evacuates the space between the overcladding tube 44 and the primary optical fiber preform 46. The flow rate through channel 56 will determine the extent to which the gas pressure in the space is reduced, and thus control of the flow rate from nitrogen gas supply 48 will control the pressure in the space. Dehydrated nitrogen gas is used in the preferred embodiment because its low molecular weight is advantageous for purging the space between the primary preform and the overcladding tube and it prevents moisture from entering the space during the fusing process. Nitrogen also has the advantages of being inexpensive, safe to handle, and inert.

This arrangement provides a simple and finely adjustable means to apply a reduced pressure in the space between overcladding tube 44 and primary optical fiber preform 46, whereby a pressure differential is created between the pressure inside the overcladding tube and outside it. Also, it automatically compensates for reduction in the volume of the space as the two members become fused together, and it removes moisture that may evolve from them during the fusing process. Adjoiner 47 provides these features while allowing secondary preform assembly 50 to be assembled in a step separate from being mounted in preform supply unit 42. This feature enables apparatus 40 to operate more productively because production need not be suspended for the time required to assemble secondary preform assembly 50.

Figure 7:
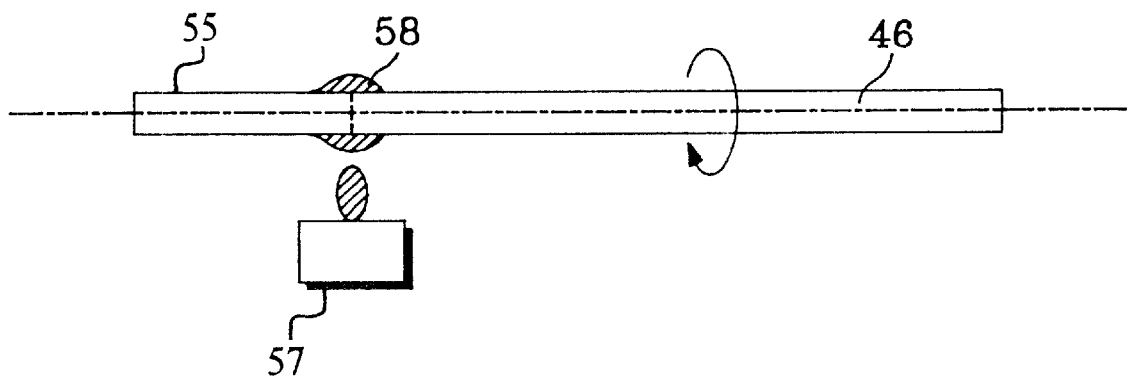
FIG. 7 illustrates the operation for forming a swollen globe on one end of the primary optical fiber preform by heating according to the present invention.

A process for assembling secondary preform assembly 50 and drawing an optical fiber from it according to the principles of the present invention will now be described with reference to FIGS. 5–9. First, as illustrated in FIG. 7, the lower end of primary optical fiber preform 46 is connected end-to-end with an extender 55, which preferably is a quartz tube of low purity. The region around the connection melted at 1400° C. to form a swollen part 58 shaped like a globe. Extender 55 is then removed from the end of primary optical fiber preform 46, leaving swollen part 58.

Figure 8:
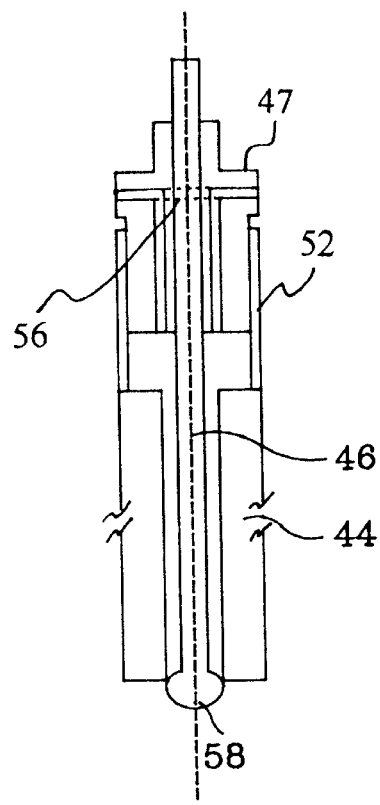
FIG. 8 illustrates a primary optical fiber preform arranged within an overcladding tube to prepare a secondary preform assembly according to the present invention.
Figure 9:
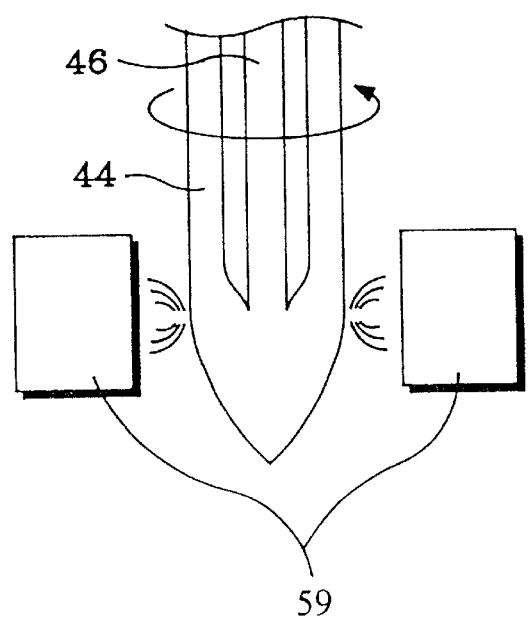
FIG. 9 illustrates the operation for rounding the lower end of the secondary preform assembly by melting.

Primary optical fiber preform is centrally inserted into overcladding tube 44 with the upper face of swollen part 58 abutting the lower end of overcladding tube 44 as shown in FIG. 8. The upper end of primary optical fiber preform 46 is fixedly mounted to adjoiner 47 as described above with reference to FIG. 6A. Heat at 1400° C., provided by a torch 57, for example, is then applied to swollen part 58 and the contiguous lower end of overcladding tube 44 for 3 to 4 minutes. Simultaneously with this application of heat, the tube-preform-adjoiner assembly is rotated about its longitudinal axis at 15 RPM and the space between primary optical fiber preform 46 and overcladding tube 44 is partially evacuated by flowing nitrogen gas into inlet tube A of adjoiner 47. This operation results in swollen part 58 and the contiguous lower end of overcladding tube 44 becoming hermetically fused together. The resultant is secondary preform assembly 50 comprising overcladding tube 44 and primary optical fiber preform 46.

Secondary preform assembly is then mounted in preform supply unit 42 and its lower end is supplied to furnace 28, heated to a temperature of 2350° C., under the control of preform position control mechanism 35. After 15 minutes of heating, the space between primary optical fiber preform 46 and overcladding tube 44 is again partially evacuated by passing nitrogen gas through channel 56 via inlet tube A. This state is maintained for 25 minutes, after which the bottom of the furnace is opened to allow the molten end of secondary preform assembly 50 to fall. A standard optical fiber fabrication procedure then commences with drawing of an optical fiber 36. For example, optical fiber 36 is monitored and its diameter maintained at not greater than 125 $\mu$m, it is coated by first and second coaters 30 and 32. Capstan 34 provides the motive force for continuously drawing optical fiber 36. The drawing speed is automatically adjusted within a range of 300 m to 700 m per minute.

Thus, the present invention provides an apparatus for drawing an optical fiber from a rod and tube arrangement without a separate step of fabricating a secondary optical fiber preform. This integration of process steps considerably reduces production time, and thus raises productivity of the fiber drawing plant, while requiring only inexpensive additional hardware.

What is claimed is:

1. A process for fabricating an optical fiber, comprising steps of:

assembling an adjoiner, a primary optical fiber preform having a first primary axis and an outer surface and an overcladding tube having a second primary axis and an inner surface defining an interior space, together as a secondary preform assembly;

holding said primary optical fiber preform in a centrally inserted position within said interior space with said first and second primary axes in substantial alignment with each other;

supplying a flow of gas through an inlet;

generating a condition of reduced pressure within a predetermined region of said adjoiner as compared to an external pressure of said adjoiner, in response to said flow of gas, wherein said predetermined region includes a gap formed between said inner surface of said overcladding tube and said outer surface of said primary optical fiber preform;

heating, by a furnace, a portion of said primary optical fiber preform and a portion of said overcladding tube to a softened state wherein an optical fiber can be drawn therefrom; and positioning said secondary preform assembly in a specified position with respect to said furnace.

2. The process of claim 1, wherein said first and second primary axes are coincident.

3. The process of claim 1, further comprising:
   utilizing an inlet tube, in communication with a gas supply, as said inlet through which said flow of gas is supplied;
   passing said flow of gas through a channel defined in an interior portion of said adjoiner and in communication with said inlet tube, whereby said channel receives said flow of gas from said inlet tube;
   exhausting said flow of gas through an outlet tube in communication with said channel, whereby said outlet tube receives said flow of gas from said channel; and
   generating said condition of reduced pressure by utilizing a suction tube in communication with said channel and with said interior space and passing said flow of gas over an opening in said suction tube as said flow of gas passes through said channel.

4. The process of claim 3, wherein said condition of reduced pressure is approximately 600 mm Hg when said external pressure is 760 mm Hg.

5. The process of claim 3, wherein said condition of reduced pressure is not less than 600 mm Hg.

6. The process of claim 3, wherein said adjoiner has a longitudinal axis, said channel includes an annular passage, and said suction tube extends perpendicularly from said annular passage and substantially parallel to said longitudinal axis.

7. The process of claim 6, further comprising a step of utilizing as said primary optical fiber preform a primary optical fiber preform fabricated by internal deposition.

8. The process of claim 7, wherein said primary optical fiber preform has an outer diameter in the range of about 18–22 mm.

9. The process of claim 6, wherein said gas supply supplies a flow of dehydrated nitrogen gas.

10. The process of claim 3, further comprising interposing a coupler between said overcladding tube and said adjoiner in said secondary preform assembly and communication between said suction tube and said interior space.

11. The process of claim 3, further comprised of interposing a quartz tube between said overcladding tube and said adjoiner.

12. The process of claim 1, wherein said step of positioning further comprises providing a predetermined set of control data to a position control device coupled to a preform positioner to specify said specified position.

13. The process of claim 1, further comprising interposing an adapter between said overcladding tube and said adjoiner in said secondary preform assembly.

14. The process of claim 1, further comprised of interposing a quartz tube between said overcladding tube and said adjoiner.

15. The process of claim 1, further comprised of establishing a heating zone of at least fifteen centimeters in length within said furnace.

16. A method for fabricating an optical fiber from a primary optical fiber preform having a first primary axis and an outer surface and an overcladding tube having a second primary axis and an inner surface and defining therein an interior space, said method comprising the steps of:
   assembling a secondary preform assembly having an upper end and a lower end and including said primary optical fiber preform, said overcladding tube, and an adjoiner;
   holding, by means of said adjoiner, said primary optical fiber preform in a centrally inserted position within said interior space defined by said overcladding tube and with said first and second primary axes in substantial alignment with each other;
   supplying a flow of gas via an inlet;
   generating a condition of reduced pressure within said secondary preform in response to said flow of gas supplied via said inlet, wherein said condition of reduced pressure extends into a portion of said interior space;
   sealing said lower end by heating and thereby fusing together a portion of said primary optical fiber preform at said lower end and a portion of said overcladding tube at said lower end to form a sealed preform assembly;
   applying a lower portion of said sealed preform assembly to a furnace while supplying said flow of gas via said inlet, said furnace softening said lower portion of said sealed preform assembly; and
   drawing said optical fiber from said lower portion softened by said furnace.

17. The method of claim 16, wherein each of said primary optical fiber preform and said overcladding tube has an upper end and a lower end, and comprising prior to said assembling step the further steps of:
   connecting an extender to a lower end of said primary optical fiber preform by forming a joint therebetween;
   heating said joint for a predetermined time period, thereby forming a swollen part at said joint; and
   removing a part of said extender exclusive of said swollen part, thereby leaving said primary optical fiber preform to terminate with said swollen part.

18. The method of claim 17, wherein said extender is a quartz tube.

19. The method of claim 17, wherein said predetermined time period is in the range of about 3–4 minutes.

20. The method of claim 17, wherein said assembling step includes:
   arranging said primary optical fiber preform in said centrally inserted position within said interior space, with said adjoiner connected to said primary optical fiber preform adjacent said upper end thereof and with said swollen part positioned adjacent said lower end of said overcladding tube; and
   fixedly mounting said adjoiner to said primary optical fiber preform adjacent said upper end thereof.

21. The method of claim 20, wherein said assembling step further includes fixedly connecting said adjoiner to said upper end of said overcladding tube by sealingly interposing a junction piece therebetween, thereby maintaining said first and second primary axes in said substantial alignment with each other.

22. The method of claim 16, wherein said sealing step includes applying heat at said lower end while generating said condition of reduced pressure within said portion of said interior space, said flow of gas being supplied via said inlet for a predetermined time period.

23. The method of claim 22, wherein said predetermined time period is in the range of about 3–4 minutes.

24. A process for fabricating an optical fiber, comprising steps of:
   assembling an adjoiner, a primary optical fiber preform having a first primary axis and an outer surface and an overcladding tube having a second primary axis and an inner surface defining an interior space, together as a secondary preform assembly;
   holding said primary optical fiber preform in a centrally inserted position within said interior space with said first and second primary axes in substantial alignment with each other;

supplying a flow of gas through an inlet;

generating a condition of reduced pressure within a predetermined region of said adjoiner as compared to an external pressure of said adjoiner, in response to said flow of gas, wherein said predetermined region includes a gap formed between said inner surface of said overcladding tube and said outer surface of said primary optical fiber preform;

heating, by a furnace, a portion of said primary optical fiber preform and a portion of said overcladding tube to a softened state and simultaneously drawing an optical fiber therefrom; and positioning said secondary preform assembly in a specified position with respect to said furnace.

* * * * *